(12) United States Patent
Ghanem et al.

(10) Patent No.: US 8,126,229 B2
(45) Date of Patent: *Feb. 28, 2012

(54) REDUCTION OF LYMPH TISSUE FALSE POSITIVES IN PULMONARY EMBOLISM DETECTION

(75) Inventors: Bernard S. Ghanem, Champaign, IL (US); Jianming Liang, Chester Springs, PA (US); Jinbo Bi, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/182,320

(22) Filed: Jul. 30, 2008

(65) Prior Publication Data

US 2009/0034816 A1 Feb. 5, 2009

Related U.S. Application Data

(60) Provisional application No. 60/953,747, filed on Aug. 3, 2007.

(51) Int. Cl.
G06K 9/00 (2006.01)

(52) U.S. Cl. .................................................... 382/128

(58) Field of Classification Search .................... 382/128
See application file for complete search history.

(56) References Cited

U.S. PATENT DOCUMENTS

| 7,447,344 B2 * | 11/2008 | Pichon et al. | 382/130 |
| 2006/0023925 A1 * | 2/2006 | Kiraly et al. | 382/128 |
| 2006/0056685 A1 * | 3/2006 | Kiraly et al. | 382/165 |
| 2007/0071301 A1 * | 3/2007 | Kiraly et al. | 382/131 |
| 2008/0187201 A1 * | 8/2008 | Liang et al. | 382/131 |
| 2009/0252394 A1 * | 10/2009 | Liang et al. | 382/131 |

* cited by examiner

*Primary Examiner* — Rodney Fuller
(74) *Attorney, Agent, or Firm* — Peter Robert Withstandley (57) ABSTRACT

A system for automatically detecting pulmonary emboli from medical image data includes receiving image data, automatically detecting one or more pulmonary embolism candidates from the image data, segmenting an airway tract from the image data, segmenting an artery structure from the image data, calculating a distance between each of the candidates and a nearest portion of the segmented airway, determining whether each of the candidates is within or outside of the segmented artery structure, rejecting candidates based on the calculated distance between each of the candidates and the nearest portion of the segmented airway and the determination as to whether each of the candidates is within or outside of the segmented artery structure, and indicating the location of the non-rejected candidates within the image data.

20 Claims, 10 Drawing Sheets

(a) True PE (b) Lymph FP

FIG. 7

FIG. 8

# REDUCTION OF LYMPH TISSUE FALSE POSITIVES IN PULMONARY EMBOLISM DETECTION

CROSS-REFERENCE TO RELATED APPLICATION

The present application is based on provisional application Ser. No. 60/953,747, filed Aug. 3, 2007, the entire contents of which are herein incorporated by reference.

BACKGROUND OF THE INVENTION

1. Technical Field

The present disclosure relates to pulmonary embolism detection and, more specifically, to reduction of lymph tissue false positives in pulmonary embolism detection.

2. Discussion of Related Art

A pulmonary embolism (PE) is a medical condition characterized by the partial or complete blockage of an artery within the lungs. Pulmonary emboli (PEs) can be life-threatening. For example, one in every three cases of PE generally results in death. Moreover, the occurrence of PEs has been increasing.

If accurately detected, PEs may be treated with the administration of anti-clotting medications. However, accurate diagnosis has been difficult, and is not properly identified in approximately 70% of all true PE cases.

Accordingly, accurate identification of pulmonary emboli can significantly reduce the number of missed PE identification and accordingly, lead to more timely treatment and ultimately, save lives.

Recently, approaches for detecting PEs using computed tomography (CT) medial imaging have gained popularity. Here, the patient's chest may be imaged and the resulting image data may be carefully analyzed for signs of a PE. However, due to the difficulty in distinguishing a PE from non-PE structures and image artifacts, detection of PEs using CT imaging is often prone to false positives. These identification problems may be particularly acute when looking for PEs within lymph tissue. Additionally, as the process of manually inspecting the image data can be long and tedious, limitations of human attention span and eye fatigue increase the opportunity for misidentification.

Accordingly, attention has been given to finding methods for automatic PE detection within medical image data. In automatic detection, the medical image data is analyzed by a computer system so that one or more regions of suspicion may be identified. The identified regions of suspicion may then me highlighted or otherwise brought to the attention of a medical professional, such as a radiologist, so that in reviewing the medical image data, particular attention may be given to those areas found by the computer system as having the greatest probability of being PEs. However, as discussed above, such approaches for the computer-aided detection of PEs have been particularly prone to false positives, especially in lymph/connective tissue. In fact, false positives within these areas may account for approximately one in three of all false positives.

SUMMARY

A system for automatically detecting pulmonary emboli from medical image data includes receiving medical image data, automatically detecting one or more pulmonary embolism candidates from the received medical image data, segmenting an airway tract from the received medical image data, segmenting an artery structure from the received medial image data, calculating a distance between each of the one or more automatically detected pulmonary embolism candidates and a nearest portion of the segmented airway, determining whether each of the one or more automatically detected candidates is within or outside of the segmented artery structure, rejecting one or more of the pulmonary embolism candidates based on the calculated distance between each of the candidates and the nearest portion of the segmented airway and the determination as to whether each of the candidates is within or outside of the segmented artery structure, and indicating the location of the non-rejected pulmonary embolism candidates within the medical image data.

The medical image data may include CT image data. Segmenting the airway tract from the received medical image data may include selecting a seed point within the airway tract and executing a growing algorithm to segment the airway tract. Leakage of the growing algorithm may be prevented by utilizing one or more termination templates.

Segmenting the artery structure from the received medial image data may include implementing tensor voting. Segmenting the artery structure from the received medial image data may include implementing Hessian-based vesselness scoring. Calculating the distance between each of the candidates and the nearest portion of the segmented airway may include performing a local 3D distance transform. Determining whether each of the candidates is within or outside of the segmented artery structure may include using tensor voting to evaluate the probability that the candidate is lying within an artery. Tensor voting features may be extracted from the medical image data using ellipse fitting.

Calculating the distance between each of the candidates and the nearest portion of the segmented airway may include performing Hessian-based vesselness scoring. Rejecting the candidates based on the calculated distance between each of the candidates and the nearest portion of the segmented airway and the determination as to whether each of the candidates is within or outside of the segmented artery structure may include classifying the candidates using Fisher's linear discriminant (FLD).

Rejecting the candidates based on the calculated distance between each of the candidates and the nearest portion of the segmented airway and the determination as to whether each of the candidates is within or outside of the segmented artery structure may include applying a learned classifier that is based on training data.

Rejecting the candidates based on the calculated distance between each of the candidates and the nearest portion of the segmented airway and the determination as to whether each of the candidates is within or outside of the segmented artery structure may include rejecting candidates that are less than a predetermined distance from the nearest portion of the segmented airway.

Rejecting the candidates based on the calculated distance between each of the candidates and the nearest portion of the segmented airway and the determination as to whether each of the candidates is within or outside of the segmented artery structure may include rejecting candidates that are located outside of the segmented artery structure.

The rejected PE candidates may represent lymph/connective tissue false positives.

A system for automatically detecting pulmonary emboli from medical image data includes a receiving unit for receiving medical image data, a computer-aided detection unit for automatically detecting one or more pulmonary embolism candidates from the received medical image data, a segmentation unit for segmenting an airway tract and an artery structure from the received medial image data, a candidate rejection unit for rejecting one or more of the candidates based on a distance between each of the candidates and a nearest portion of the segmented airway and based on whether each of the candidates is within or outside of the segmented artery structure, and a display unit for displaying the medical image data with the location of the non-rejected candidates marked thereon.

The candidate rejection unit may use contextual feature extraction in rejecting the one or more candidates. The candidate rejection unit may calculate a decision boundary that separates the rejected candidates from the non-rejected candidates. The candidate rejection unit may use a learning algorithm to calculate the decision boundary.

A computer system includes a processor and a program storage device readable by the computer system, embodying a program of instructions executable by the processor to perform method steps for automatically detecting pulmonary emboli from medical image data. The method includes receiving medical image data, automatically detecting one or more pulmonary embolism candidates from the received medical image data, segmenting an airway tract from the received medical image data, segmenting an artery structure from the received medical image data, calculating a distance between each of the one or more automatically detected pulmonary embolism candidates and a nearest portion of the segmented airway, determining whether each of the one or more automatically detected candidates is within or outside of the segmented artery structure, rejecting one or more of the pulmonary embolism candidates based on the calculated distance between each of the candidates and the nearest portion of the segmented airway and the determination as to whether each of the candidates is within or outside of the segmented artery structure, and indicating the location of the non-rejected pulmonary embolism candidates within the medical image data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide methods and systems for the computer-aided detection (CAD) of pulmonary emboli (PEs) with a reduction in the number of false positive detections. This may be accomplished by focusing on the detection of false positives within lymph/connective tissue, and thus by reducing the occurrence of false positives within this tissue, the total number of false positives resulting from the computer-aided detection of PEs may be significantly reduced.

Exemplary embodiments of the present invention exploit the prior knowledge that true PEs are located within an artery and should not be in contact with an airway of the lungs. Accordingly, an image feature that otherwise appears highly PE like but is found to be outside of the artery and/or in contact with an airway may be rejected as a region of suspicion, and thus the instance of false positives may be reduced.

Figure 1:
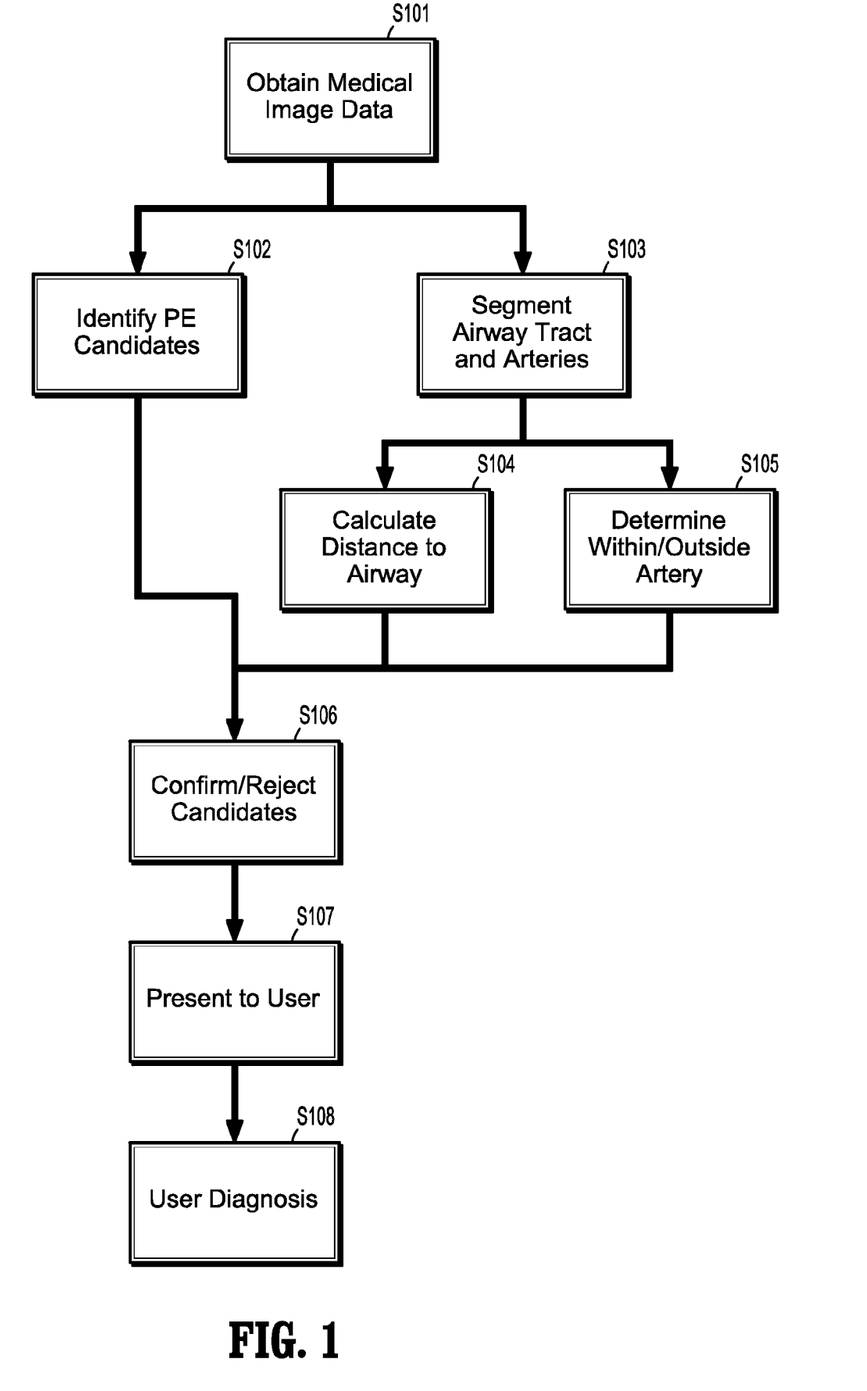
FIG. 1 is a flow chart illustrating a method for the automatic detection of pulmonary emboli according to an exemplary embodiment of the present invention.

FIG. 1 is a flow chart illustrating a method for the automatic detection of pulmonary emboli according to an exemplary embodiment of the present invention. First, medical image data may be obtained (Step S101). Medical image data may be obtained by performing a scan of a patient using a medical imaging device, such as a CT scanner, or by retrieving stored medical image data from a database. Then the medical image data may be analyzed to detect and identify a series of PE candidates (Step S102). Each identified candidate may include a cluster of one or more pixels or voxels, depending on whether the medical image data is two-dimensional or three-dimensional.

The airway tract and the arteries may be segmented from the medical image data (Step S103). This step may be performed before, during and/or after the detection of the PE candidates (Step S102). For example, image processing techniques and computer vision techniques using tensor voting and/or Hessian-based "vesselness" scoring may be used for segmentation of the arteries. Other techniques for effective segmentation of the arteries and airway tract may also/alternatively be used.

According to one exemplary embodiment of the present invention, Fisher linear discrimination analysis (FLS) may be reformulated into a multiple-instance learning framework, since more than one PE candidate may belong to the same PE structure.

After the PE candidates have been identified and the airways and arteries have been segmented, for each PE candidate, a distance may be calculated to the nearest airway (Step S104) and it may be determined whether the candidate is within or outside of an artery (Step S105). These two steps may together form contextual feature extraction. Contextual feature extraction may also include one or more other analytical steps. These calculations may be performed in any order. Then, candidates that are found to be located outside of an artery and/or less than a particular distance from an airway may be rejected as candidates, while those candidates that are found to be located inside of an artery and/or greater than a particular distance from an airway may be confirmed as PE candidates (Step S106). In this step, additional contextual features may also be considered. The confirmed PE candidates may then be presented to a user (Step S107), who may be a medical professional such as a radiologist. Presentation of the confirmed candidates may include display of the medical image data that has been highlighted or otherwise marked to show the location of the confirmed PE candidates. The user may then analyze the highlighted/marked medical image data to render a diagnosis (Step S108). The diagnosis may include a determination as to whether each PE candidate is a true PE or a false positive.

As discussed herein, lymph/connective tissue refers to all tissue or tissue-like matter that is in direct contact with both an airway and an artery that exhibits an image intensity distribution that is similar to a PE.

Distance to Airway

In calculating the distance between each PE candidate and the nearest airway, first the airway tract may be segmented. Airway segmentation may be performed using a local region growing algorithm. Here, an initial seed point may be selected inside the airway tract. For example, the carina position may be selected as a seed point. A recursive process may then be employed whereby the seed comprises an airway region and the airway region is grown to include its direct neighbors to the extent that they do not appear to be termination points, as determined by comparison to one or more termination templates. Termination points may include airway walls.

To prevent leakage, the phenomenon where the growing airway region moves beyond the airway, growth may be prevented beyond sites where the airway walls get thinner and/or disappear. This may be accomplished by utilizing termination templates that are designed to recognize the thinning or disappearance of the airway walls.

One or more of the termination templates may use intensity-based thresholding to accurately identify termination points. Here, the known intensity distribution characteristics of airway voxels within CT volumes of the lungs may be used to define the termination templates. For example, it may be understood that the airway voxels include especially dark regions. Other templates may ensure that the growth region remains within the airway by casting decisions as to whether a local airway boundary has been reached. The thresholds may be spatially adapted by the use of these templates and the size of the neighborhood surrounding the seed point. At potential leakage points, fewer voxels may be grown and larger neighborhoods may be used, as compared with regions that are not considered potential leakage points. Accordingly, the growing method converges to an accurate non-conservative segmentation.

Figure 2A:
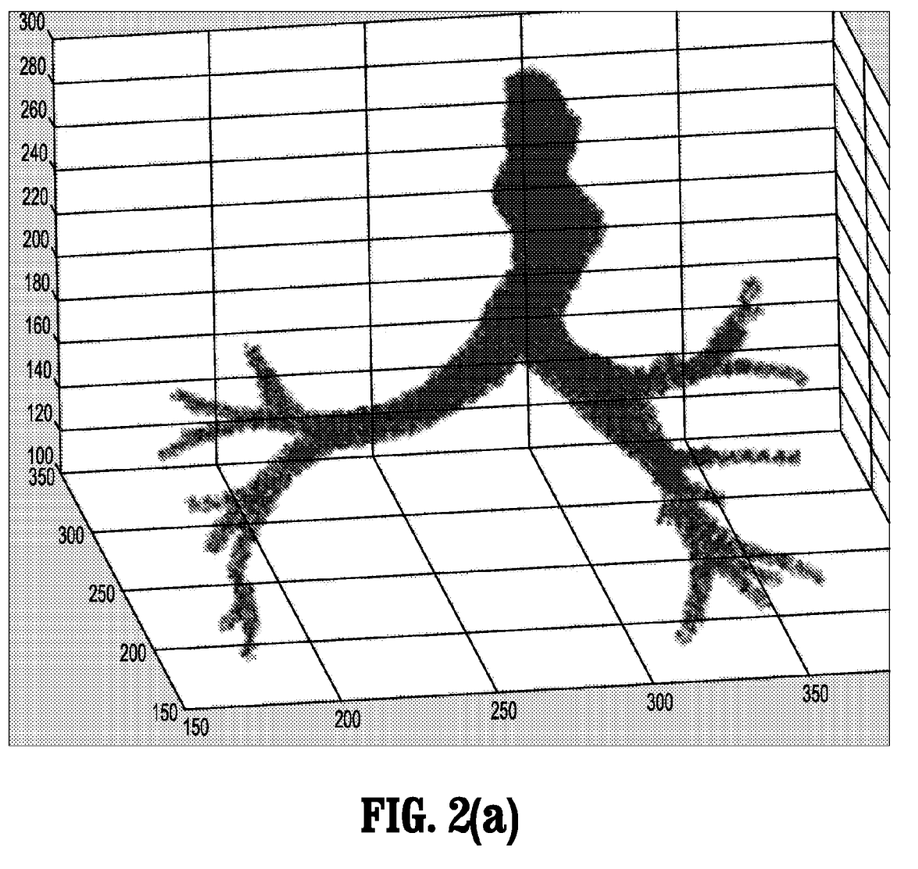
FIGS. 2(a)-2(c) illustrate the result of applying airway segmentation to two CT image volumes of the lungs according to an exemplary embodiment of the present invention.
Figure 2B:
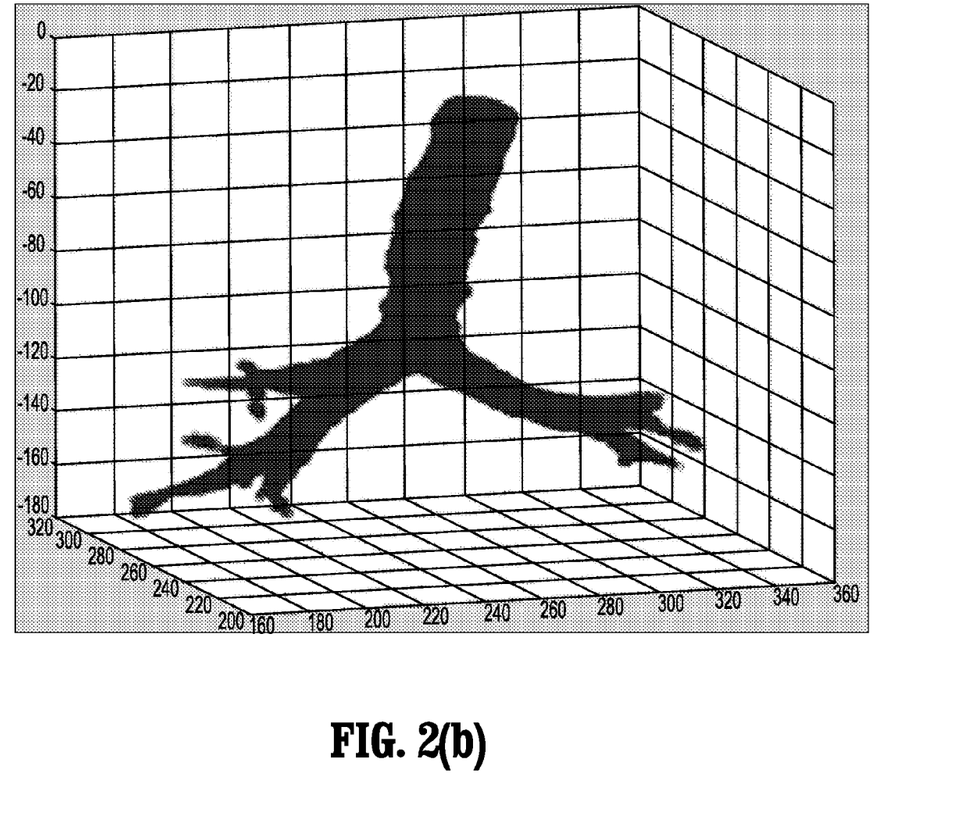
Figure 2C:
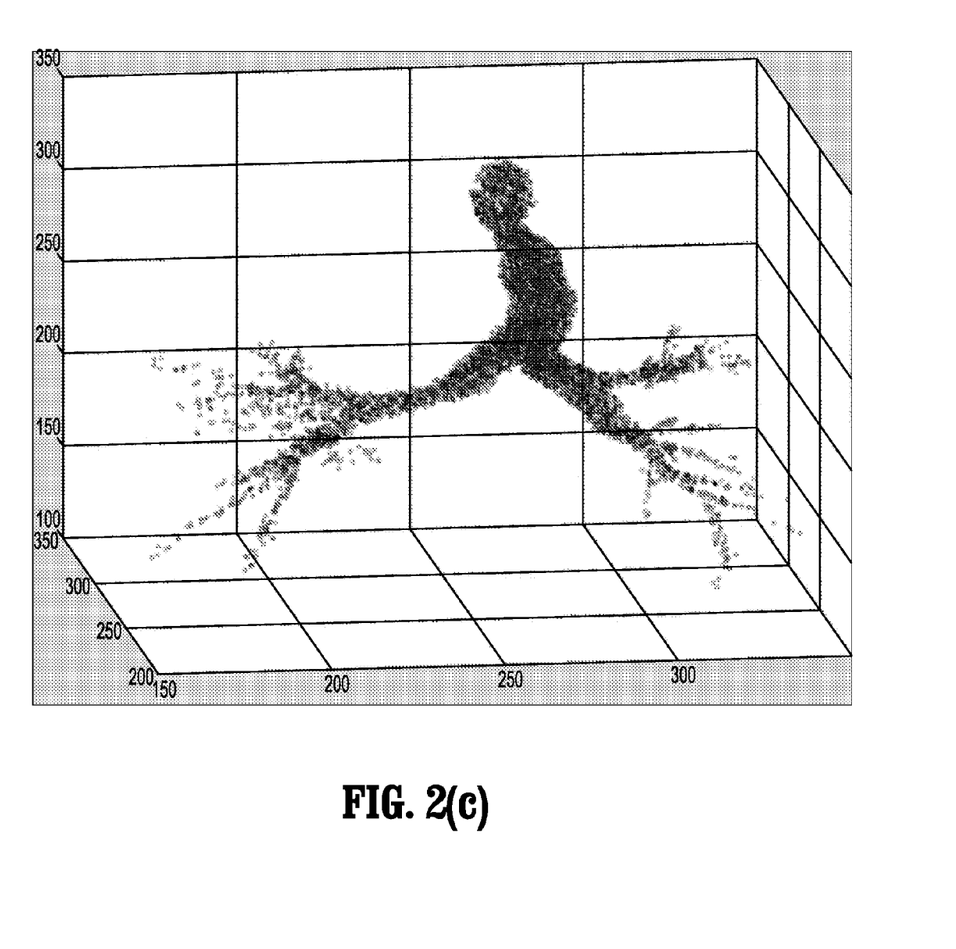

FIGS. 2(a)-2(c) illustrate the result of applying airway segmentation to two CT image volumes of the lungs according to an exemplary embodiment of the present invention. FIG. 2(a), FIG. 2(b), and FIG. 2(c) represent three different examples of images for which the airways have been segmented. Here, the actual airway segmentation has been sampled for illustrative purposes. Exemplary embodiments of the present invention may utilize sampled airway segmentations. Segmentations that have been sampled at a higher rate may appear to be more solid (such as with FIG. 2(b)) while segmentations that have been sampled at a lower rate may appear more sparse (such as with FIG. 2(c)). FIG. 2(a) illustrates a segmentation that has been sampled at a moderate rate.

As described above, after performing airway segmentation, the distance from each PE candidate to the nearest portion of the segmented airway may be determined. This distance may be computed, for example, by performing a local 3D distance transform.

Distance to Artery

In determining the relative position of each PE candidate to the artery, for example, whether the PE is within or outside of the closest artery segment, the artery may be segmented and then it may be determined whether each candidate is located within the artery. However, complete segmentation of all arteries within the medical image may be time consuming and computationally expensive. Moreover, this process may result in error, especially in the vicinity of a PE. Accordingly, rather than performing a complete segmentation of the arteries using other means, the local description of the context of a PE candidate relative to an artery may be performed using two sets of features. The first set of features may be tensor voting features. These features may be extracted from the CT image data, for example, by using ellipse fitting. The second set of features may be "vesselness" features based on the Frangi, Sato, and Lorenz methods, for example, as described in detail below.

Figure 3:
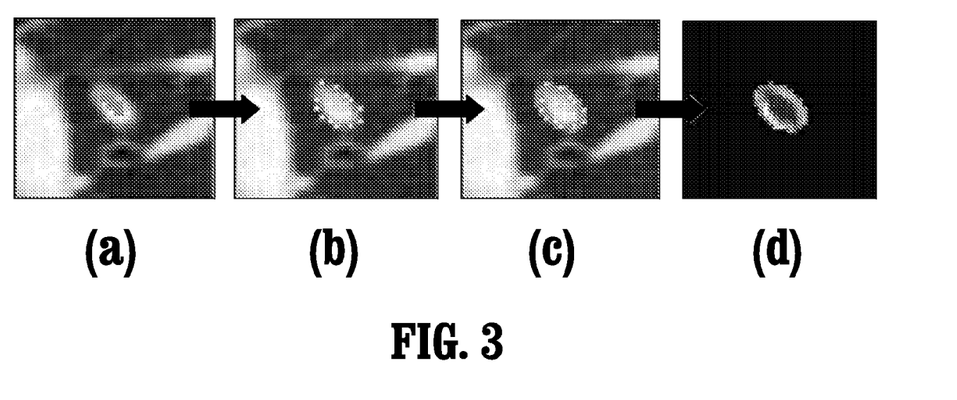
FIG. 3 is an image-based flow chart illustrating a method for performing contextual feature extraction according to an exemplary embodiment of the present invention.

FIG. 3 is an image-based flow chart illustrating a method for performing contextual feature extraction according to an exemplary embodiment of the present invention. In extracting tensor voting features, for each candidate, various cutting planes may be extracted about the location of the candidate. For each cutting plane, a set of features may be extracted according to the general layout depicted in FIG. 3.

A cutting plane may then be found for each candidate wherein the candidate lies within an ellipse representing the contours of an artery. This may be true for every candidate other than a lymph candidate. For a lymph candidate, no such plane exists. In each cutting plane, rays may be cast from the candidate and an intensity minima is determined along each ray. This radial minima extraction step may be characterized by the transition from FIG. 3(a) to FIG. 3(b). The determined minima along each ray may be fit to an elliptical model, for example, using eigen-fitting. This ellipse fitting step may be characterized by the transition from FIG. 3(b) to FIG. 3(c). The likelihood for whether the fitted ellipse represents an artery cross section may then be estimated based on tensor voting. This tensor voting step may be characterized by the transition from FIG. 3(c) to FIG. 3(d).

Accordingly, tensor voting may be used to evaluate the probability that the candidate is lying within an artery. This may be performed non-parametrically, for example, without a predefined probability model. Accordingly, local information, for example, gradient direction and magnitude, may be accumulated at the local sites of the fitted ellipse to render global knowledge of its context, while remaining robust to noise and outliers.

In computing tensor votes, for each cutting plane, two sets of pixels are generated. The first set of pixels may be voter points. Voter points may be determined by finding the points with the highest gradient energy in the plane. The second set of pixels may be receiver points. Receiver points may be determined by finding the pixels that constitute the interior and boundary of the fitted ellipse. Each voter point may cast a separate second order tensor vote on each receiver point. The tensor vote may thus be a rank-1 positive semi-definite matrix that is dependent upon both the orientation of the voter with respect to the receiver ($\theta$), the distance between the voter and the receiver (l), and the stick tensor at the voter whose magnitude is denoted as $|S_V|$.

Figure 4:
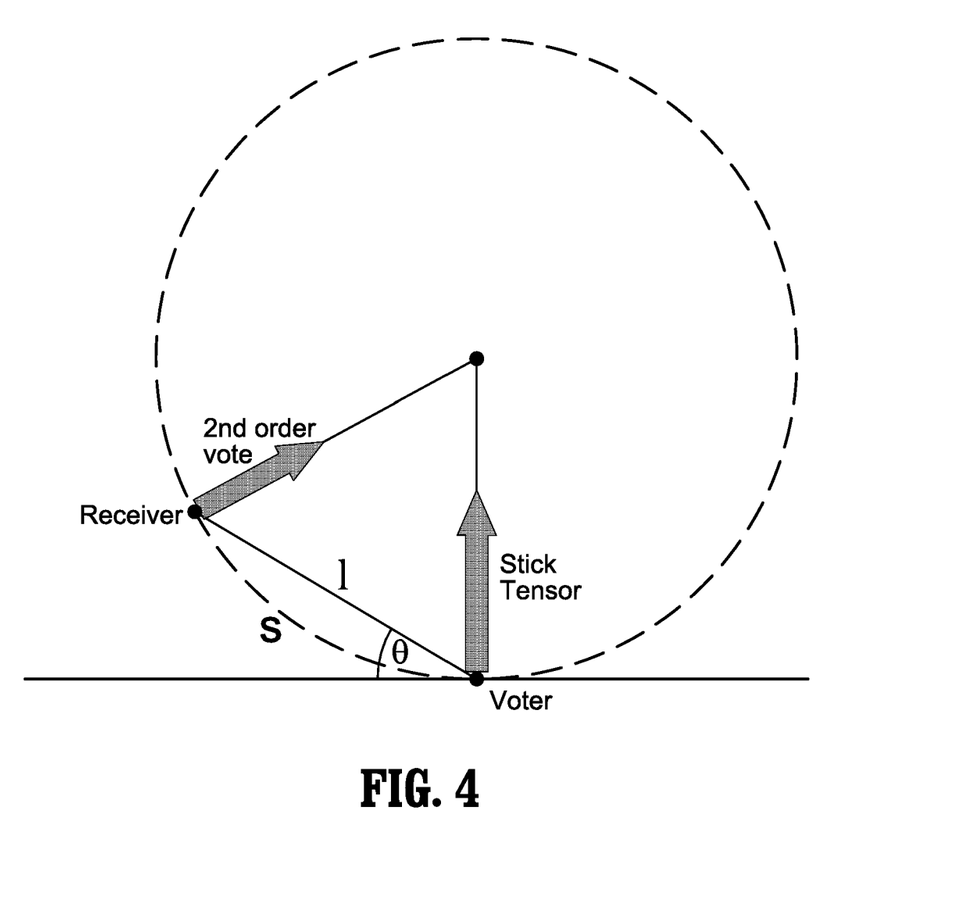
FIG. 4 is a diagram illustrating the geometric layout of the casting of a second-order vote according to an exemplary embodiment of the present invention.
Figure 5:
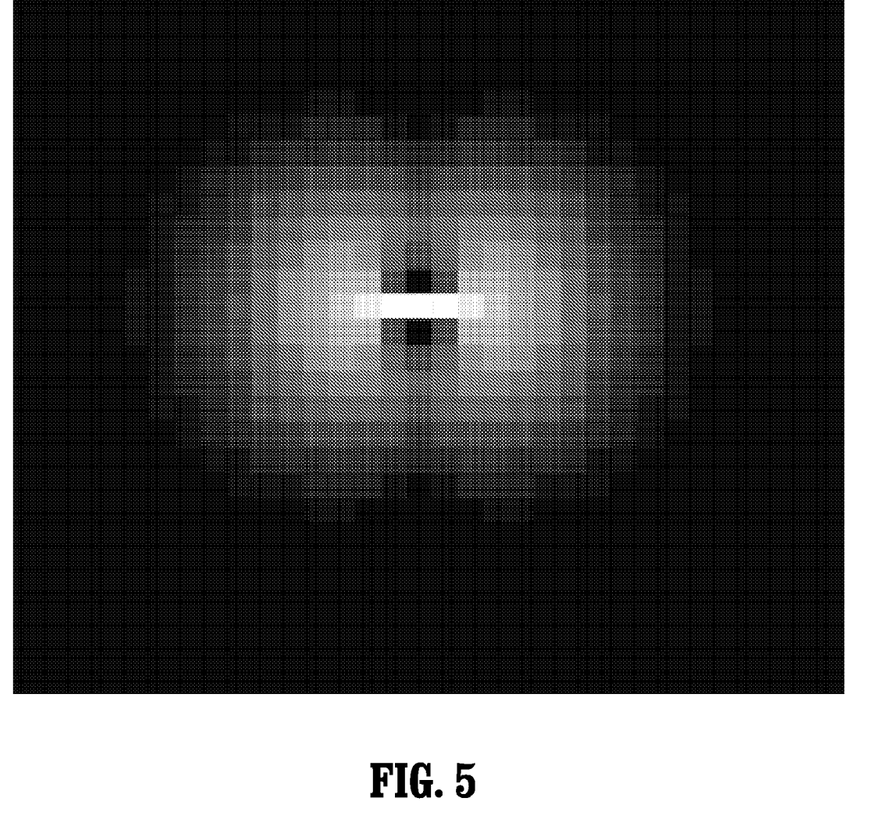
FIG. 5 is a diagram illustrating a decay function of a voter found at the origin with $|S_V|=1$ according to an exemplary embodiment of the present invention.
Figure 6:
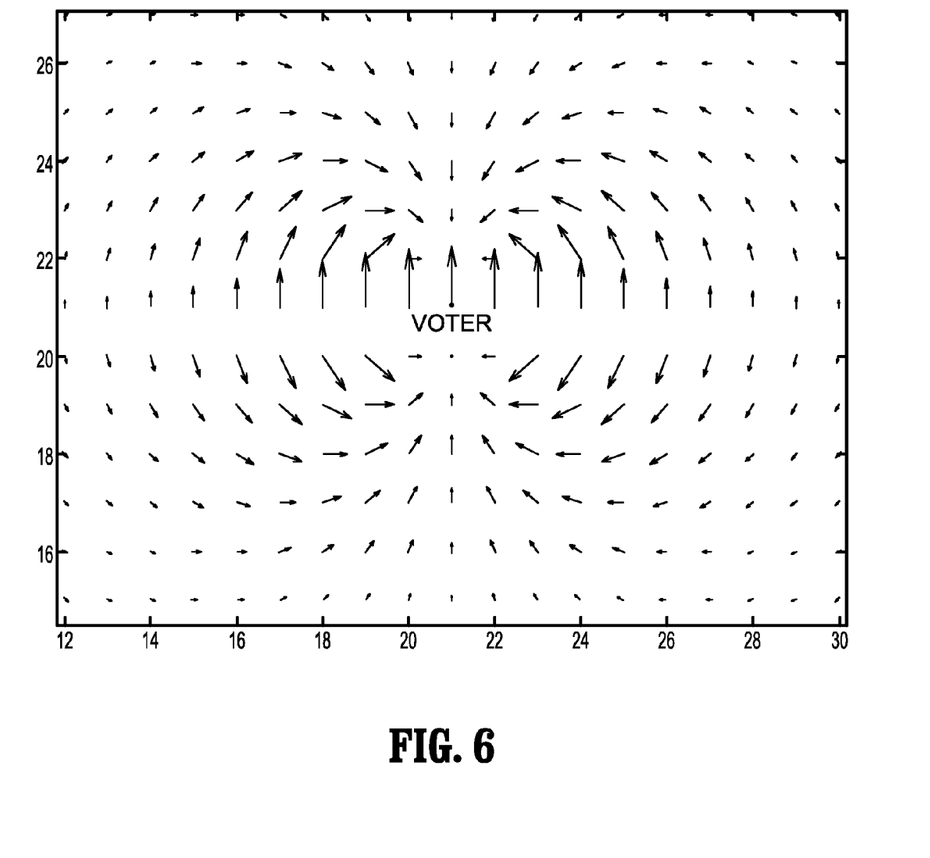
FIG. 6 is a diagram illustrating how a second order tensor vote is cast by a voter at the origin according to an exemplary embodiment of the present invention.

According to this approach, a voter's stick tensor may be set to the intensity gradient. FIG. 4 is a diagram illustrating the geometric layout of the casting of a second-order vote according to an exemplary embodiment of the present invention. Here, the voter casts a single vote at a receiver point, where the voting parameters s, l, and θ are defined. FIG. 5 is a diagram illustrating a decay function of a voter found at the origin with $|S_V|=1$ according to an exemplary embodiment of the present invention. FIG. 6 is a diagram illustrating how a second order tensor vote is cast by a voter at the origin. In FIGS. 5 and 6, the decay function for a voter at the origin with $|S_V|=1$ is plotted. These figures also show that each second order vote is cast by the voter to its respective receiver. The tensor vote between voter V and receiver R may be computed in accordance with equation (1). The scale of the decay function defined by σ may be a free parameter that may be set based on the size of the fitted ellipse.

$$s = \frac{l\theta}{\sin(\theta)}, \quad (1)$$

$$\kappa = \frac{2\sin(\theta)}{l} \Rightarrow DF(s, \kappa, \sigma) = \left| S_V \left| e^{-\frac{s^2+c\kappa}{\sigma^2}} \right. \right.$$

$$TV(V \to R) = DF(s, \kappa, \sigma) \begin{bmatrix} \sin(2\theta)^2 & -\sin(2\theta)\cos(2\theta) \\ -\sin(2\theta)\cos(2\theta) & \sin(2\theta)^2 \end{bmatrix}$$

The cumulative vote $TV_{CUM}^R$ received at a receiver point may be the sum of all of the second order tensors cast by the voter points to this receiver point. The tensor voting score ($\delta_R$) for this point may be the difference between the positive eigenvalues of $TV_{CUM}^R$. The higher $\delta_R$ is, the greater the probability that the receiver point lies on the boundary of a smooth curve. Moreover, the lower $\delta_R$ is, the greater the probability that the receiver point is within a smoothly bounded region.

Figure 7:
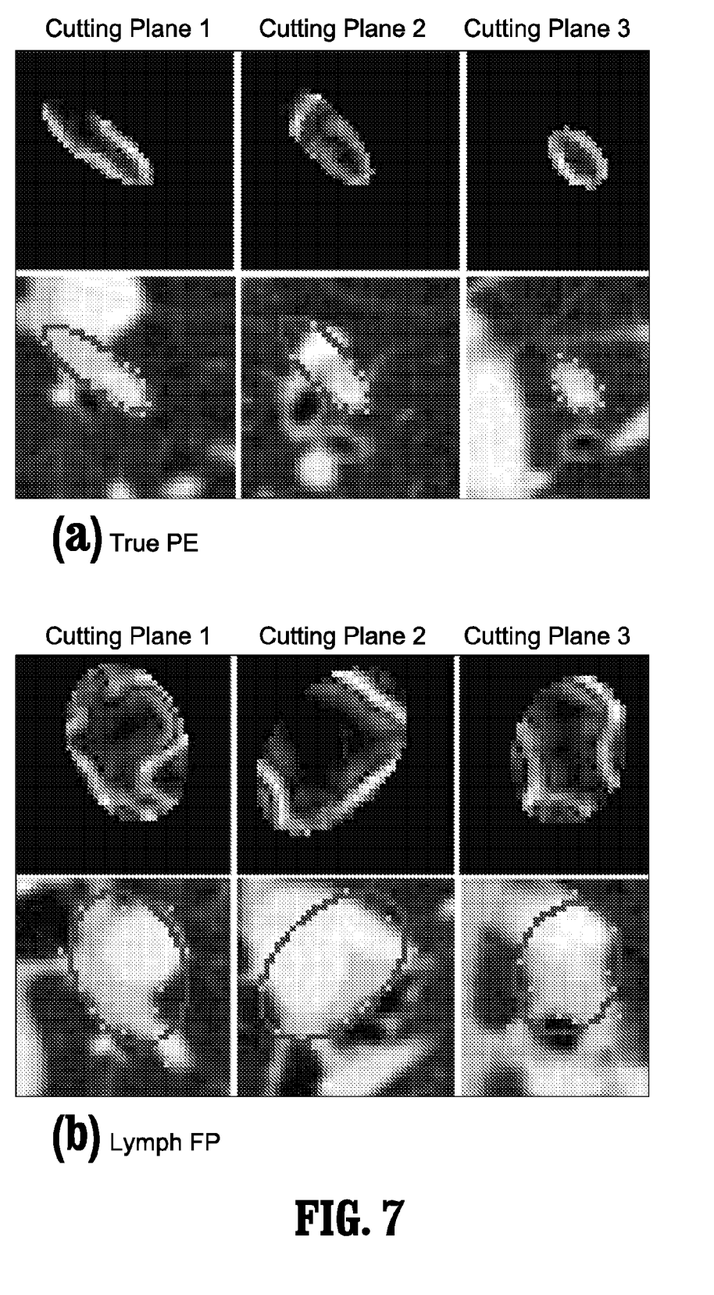
FIG. 7. is a sequence of images illustrating tensor voting features extracted at the ellipse boundary and interior along three cutting planes according to an exemplary embodiment of the present invention.

FIG. 7 is a sequence of images illustrating tensor voting features extracted at the ellipse boundary and interior, for a true PE, shown in FIG. 7(a), and for a lymph false positive (FP) shown in FIG. 7(b) along three cutting planes 1, 2 and 3. As can be seen from FIG. 7, the tensor voting score varies between the true PE candidates and the lymph FP, respectively. In the case of a true PE candidate, there may be found a cutting plane with significantly low fitting cost and a low voting score in the interior of the fitted ellipse while there may be a high voting score at the boundary of the ellipse. However, for candidates detected within lymph tissue, the fitting cost and the interior voting score may be much higher, while the boundary voting score may be much lower.

As discussed above, Hessian-based "vesselness" scoring may be used, in addition to or in place of tensor voting, to effectively segment the arteries. Use of this approach is premised on the notion that if a voxel is inside a vessel then the Hessian matrix formed from second derivatives of intensity in the neighborhood of the first two eigenvalues lies in a plane orthogonal to the central axis of the vessel. The Eigenvectors corresponding to the first two eigenvalues lie in a plane orthogonal to the central axis of the vessel. The Eigenvector corresponding to the third eigenvalue is in the direction of this central axis. Such discriminative power may be manipulated to remove from consideration those candidates lying outside of blood vessels, for example, lymph tissue. However, this approach is effective where the vessel does not have PEs. Accordingly, prior to performing this procedure, the detected region may be filled with high intensity values so that the inside of an artery having a PE may be simulated.

In computing these Hessian features, first the detected region may be filled with high intensity values. Then, the eigenvalues for each voxel in the candidate may be calculated. Calculation of the eigenvalues for each voxel includes: (1) constructing the Hessian matrix, (2) computing the three eigenvalues and their ratios, where $|\lambda_1| \leq |\lambda_2| \leq |\lambda_3|$, and (3) computing three vesselness properties at each voxel ($\vec{x}$), based on the Frangi (Equation 2), Sato (Equation 3), and Lorenz (Equation 4) methods known in the art, wherein $\alpha=\beta=\gamma=\sigma=\xi=\tau=\rho=1$:

$$F(\vec{x}) = \left[1 - e^{-\frac{1}{2}\left(\frac{\lambda_2}{\alpha\lambda_3}\right)^2}\right] e^{-\frac{1}{2|\lambda_2\lambda_3|}\left(\frac{\lambda_1}{\beta}\right)^2} \left[1 - e^{-\frac{\lambda_1^2+\lambda_2^2+\lambda_3^2}{2\gamma^2}}\right] \quad (2)$$

$$S(\vec{x}) = \begin{cases} \sigma^2 \left|\lambda_3\right| \left(\frac{\lambda_2}{\lambda_3}\right)^\xi \left(1 + \frac{\lambda_1}{|\lambda_2|}\right)^\tau, \lambda_3 \leq \lambda_2 \leq \lambda_1 \leq 0 \\ \sigma^2 \left|\lambda_3\right| \left(\frac{\lambda_2}{\lambda_3}\right)^\xi \left(1 - \rho\frac{\lambda_1}{|\lambda_2|}\right)^\tau, \lambda_3 \leq \lambda_2 \leq 0 \leq \lambda_1 \leq \frac{|\lambda_2|}{\rho} \end{cases} \quad (3)$$

$$L(\vec{x}) = \sigma^\eta \left|\frac{\lambda_2 + \lambda_3}{2}\right| \quad (4)$$

After the three vesselness properties have been computed at each voxel as described above, statistics, for example, maximum, minimum, mean, and standard deviation, may be calculated based on the computed eigenvalues and ratios for all of the voxels in each candidate.

A true PE may then be differentiated from a lymph FP because for the true PE, these vesselness features may be much higher in magnitude than for the case of a lymph PE.

After the distance to the nearest airway has been determined and the relative position to the nearest vessel has been determined, each PE candidate may be classified. A classification algorithm may be used. For example, the classification algorithm may be based on Fisher's linear discriminant (FLD) analysis that aims to detect at least one hit for each lesion. According to this technique, the separation boundary between true hits and negative detections may be fitted to the linear function $\vec{w}^T\vec{x}+b$. FLD may also be adapted to solve an equivalent optimization problem, for example, as shown in Equation 5, where C+ and C− are respectively the sets of positive (true PE) and negative (non-PE) samples. Here, $y_i$ denotes the label; $\xi_i$ represents the residual error of the model fitting; $\|\vec{w}\|_2^2$ represents the regularizaion term that controls the classifier complexity, and γ represents the trade-off between the residual error and the complexity regularization.

$$\min \sum_{i=1}^m \xi_i^2 + \gamma \|\vec{w}\|_2^2 \quad (5)$$

$$\text{subject to} \begin{cases} \vec{w}^T \vec{x}_i + b = y_i + \xi_i, \forall i = 1, \ldots, m \\ \sum_{i \in C+} \xi_i =, \sum_{i \in C-} \xi_i = 0 \end{cases}$$

Here, it may be assumed that there are a total of $n_t$ candidates, with each candidate represented as a feature vector $\vec{x}_{ij}$. Each candidate may be segmented for the $i^{th}$ lesion. Si may represent the index set of all candidates pointing to the $i^{th}$ lesion. For each lesion, a convex hull may be formed using the vectors $\vec{x}_{ij}$ in the feature space. Each point of the convex hull may be represented as a convex combination of $\vec{x}_{ij}$ (for example, $\rho_{j \in S_i} \lambda_{ij} \vec{x}_{ij}$ where $\lambda_{ij} \geq 0$, $\Sigma \lambda_{ij}=1$). A learning algorithm may then be used to determine a decision boundary that can accurately separate parts of the convex hulls from the greatest number of possible negative detections. Accordingly, it may not be necessary to classify the entire convex hull as correct classification of a part of the convex hull may be sufficient. Thus the learning algorithm may solve the optimization problem in equation 6, based on the FLD formulation. The classifier obtained by solving this formulation may reduce false detection in comparison with standard classification algorithms such as FLD.

$$\min \sum_{i=1}^{m} \xi_i^2 + \lambda \|\vec{w}\|_2^2 \quad (6)$$

subject to $$\begin{cases} \vec{w}^T \left( \sum_{i \in S_i} \lambda_{ij} \vec{x}_{ij} \right) + b = y_i + \xi_i, \lambda_{ij} \geq 0, \sum \lambda_{ij} = 1, \forall i \in C^+ \\ \vec{w}^T \vec{x}_i + b = y_i + \xi_i, \forall i \in C^- \\ \sum_{i \in C+} \xi_i = 0, \sum_{i \in C-} \xi_i = 0 \end{cases}$$

Aggregation of multiple classifiers may be used to produce an average aggregated prediction for an unseen sample. The aggregation may be effective for learning algorithms where small changes in the training set may result in large changes in predictions. As used herein, reasonably small changes on the training sample set may cause an undesirable changes on the classifier constructed with limited availability of patient data. Accordingly, aggregation may be used to reduce the variance of the learned classifier over various sample patient sets, thus increasing accuracy. Here, T trials may be carried out, and in each trial, 70% of the training set may be randomly sampled and used for training. A linear function $f_t(\vec{x}) = \vec{w}_t \vec{x} + b_t$ may then be constructed in the trial t. The final classifier may then be based on the average model:

$$f(\vec{x}) = \frac{1}{T} \sum_{t=1}^{T} f_t(\vec{x}) = \frac{1}{T} \left( \sum_{t=1}^{T} \vec{w}_t \right)^T \vec{x} + \frac{1}{T} \sum_{t=1}^{T} b_t.$$

Features with very small weights in the function $f_t(x)$ may then be removed to reduce the model noise. Thus only the top $N_f$ features with large weights may remain in the final model. For example, $N_f$ may be equal to 35 and if a candidate $\vec{x}_i$ satisfies $f(\vec{x}) \geq a$, then the candidate may be classified as a true PE. Otherwise, the candidate may be classified as a non-PE.

Figure 8:
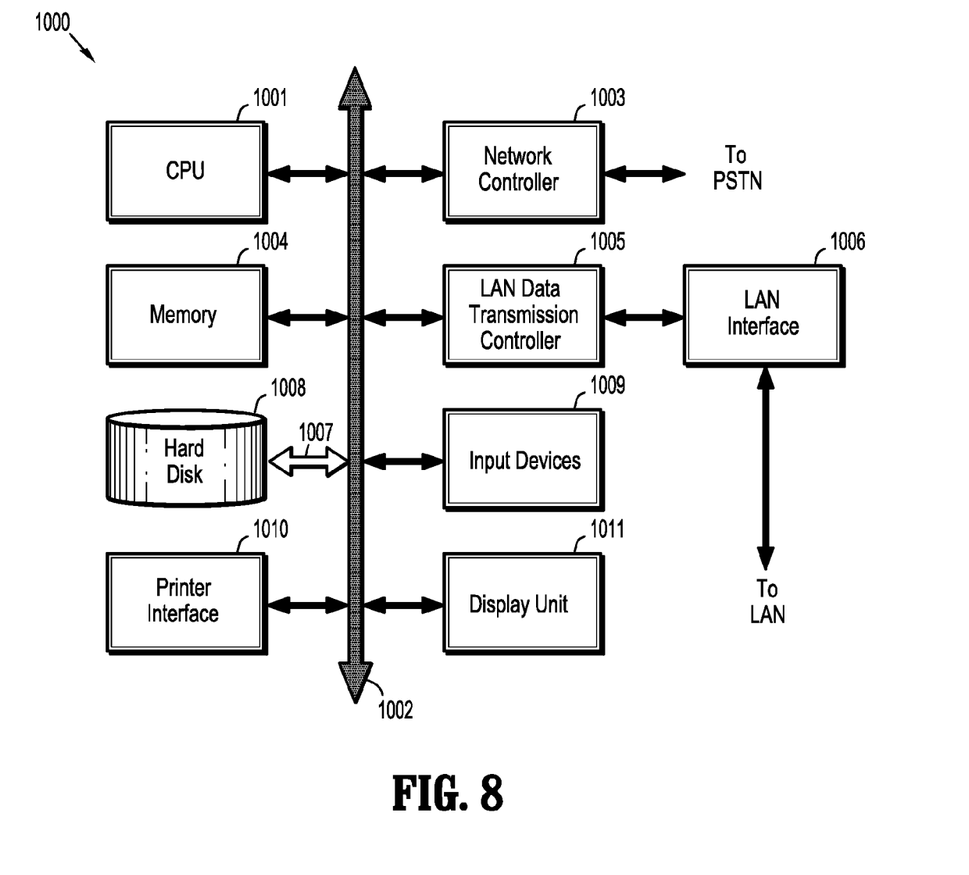
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for automatically detecting pulmonary emboli from medical image data, comprising:
   receiving medical image data; automatically detecting one or more pulmonary embolism candidates from the received medical image data;
   segmenting an airway tract from the received medical image data;
   segmenting an artery structure from the received medial image data;
   calculating a distance between each of the one or more automatically detected pulmonary embolism candidates and a nearest portion of the segmented airway;
   determining whether each of the one or more automatically detected candidates is within or outside of the segmented artery structure;
   rejecting one or more of the pulmonary embolism candidates based on the calculated distance between each of the candidates and the nearest portion of the segmented airway and the determination as to whether each of the candidates is within or outside of the segmented artery structure; and
   indicating the location of the non-rejected pulmonary embolism candidates within the medical image data.

2. The method of claim 1, wherein the medical image data includes CT image data.

3. The method of claim 1, wherein segmenting the airway tract from the received medical image data includes selecting a seed point within the airway tract and executing a growing algorithm to segment the airway tract.

4. The method of claim 3, wherein leakage of the growing algorithm is prevented by utilizing one or more termination templates.

5. The method of claim 1, wherein segmenting the artery structure from the received medial image data includes implementing tensor voting.

6. The method of claim 1, wherein segmenting the artery structure from the received medial image data includes implementing Hessian-based vesselness scoring.

7. The method of claim 1, wherein calculating the distance between each of the candidates and the nearest portion of the segmented airway includes performing a local 3D distance transform.

8. The method of claim 1, wherein determining whether each of the candidates is within or outside of the segmented artery structure includes using tensor voting to evaluate the probability that the candidate is lying within an artery.

9. The method of claim 8, wherein tensor voting features are extracted from the medical image data using ellipse fitting.

10. The method of claim 1, wherein calculating the distance between each of the candidates and the nearest portion of the segmented airway includes performing Hessian-based vesselness scoring.

11. The method of claim 1, wherein rejecting the candidates based on the calculated distance between each of the candidates and the nearest portion of the segmented airway and the determination as to whether each of the candidates is within or outside of the segmented artery structure includes classifying the candidates using Fisher's linear discriminant (FLD).

12. The method of claim 1, wherein rejecting the candidates based on the calculated distance between each of the candidates and the nearest portion of the segmented airway and the determination as to whether each of the candidates is within or outside of the segmented artery structure includes applying a learned classifier that is based on training data.

13. The method of claim 1, wherein rejecting the candidates based on the calculated distance between each of the candidates and the nearest portion of the segmented airway and the determination as to whether each of the candidates is within or outside of the segmented artery structure includes rejecting candidates that are less than a predetermined distance from the nearest portion of the segmented airway.

14. The method of claim 1, wherein rejecting the candidates based on the calculated distance between each of the candidates and the nearest portion of the segmented airway and the determination as to whether each of the candidates is within or outside of the segmented artery structure includes rejecting candidates that are located outside of the segmented artery structure.

15. The method of claim 1, wherein the rejected PE candidates represent lymph/connective tissue false positives.

16. A system for automatically detecting pulmonary emboli from medical image data, comprising:
   a receiving unit for receiving medical image data;
   a computer-aided detection unit for automatically detecting one or more pulmonary embolism candidates from the received medical image data;
   a segmentation unit for segmenting an airway tract and an artery structure from the received medial image data;
   a candidate rejection unit for rejecting one or more of the candidates based on a distance between each of the candidates and a nearest portion of the segmented airway and based on whether each of the candidates is within or outside of the segmented artery structure; and
   a display unit for displaying the medical image data with the location of the non-rejected candidates marked thereon.

17. The system of claim 16, wherein the candidate rejection unit uses contextual feature extraction in rejecting the one or more candidates.

18. The system of claim 16, wherein the candidate rejection unit calculates a decision boundary that separates the rejected candidates from the non-rejected candidates.

19. The system of claim 18, wherein the candidate rejection unit uses a learning algorithm to calculate the decision boundary.

20. A computer system comprising:
   a processor; and
   a non-transitory program storage device readable by the computer system, embodying a program of instructions executable by the processor to perform method steps for automatically detecting pulmonary emboli from medical image data, the method comprising:
   receiving medical image data;
   automatically detecting one or more pulmonary embolism candidates from the received medical image data;
   segmenting an airway tract from the received medical image data;
   segmenting an artery structure from the received medial image data;
   calculating a distance between each of the one or more automatically detected pulmonary embolism candidates and a nearest portion of the segmented airway;
   determining whether each of the one or more automatically detected candidates is within or outside of the segmented artery structure;
   rejecting one or more of the pulmonary embolism candidates based on the calculated distance between each of the candidates and the nearest portion of the segmented airway and the determination as to whether each of the candidates is within or outside of the segmented artery structure; and
   indicating the location of the non-rejected pulmonary embolism candidates within the medical image data.

* * * * *